Dec. 16, 1969 D. W. SCHAEFFER 3,484,547

ERROR REDUCTION CODING FOR DIGITAL FACSIMILE

Filed Aug. 30, 1965 2 Sheets-Sheet 1

INVENTOR.
DONALD W. SCHAEFFER

BY Anthony D. Cennamo

ATTORNEYS

INVENTOR.
DONALD W. SCHAEFFER
BY Anthony D. Cennamo
ATTORNEYS

United States Patent Office 3,484,547
Patented Dec. 16, 1969

3,484,547

ERROR REDUCTION CODING FOR DIGITAL FACSIMILE

Donald W. Schaeffer, West Webster, N.Y., assignor to Xerox Corporation, Rochester, N.Y., a corporation of New York Filed Aug. 30, 1965, Ser. No. 483,487
Int. Cl. H04n 7/02
U.S. Cl. 178—6 8 Claims

ABSTRACT OF THE DISCLOSURE

A system for minimizing the streaking effect of errors in the transmission of facsimile signals. A number of error correction transitions are introduced into the transmitted facsimile signals by logically mixing or combining the bi-level video pulse stream and a basic timing or clock pulse stream at the facsimile transmitter. Thus, at least a portion of the normally non-transition transmission times are chopped, divided or broken up at the basic transmitter clock rate. Due to the creation and detection of the error correction transitions in the transmitted facsimile signals, the memory type streaking effect of errors, due to noise or extraneous signals in the transmission path, is reduced to one-bit errors in the printed document at the receiver.

This invention relates to a facsimile system, and more particularly, to a method and apparatus for minimizing the effect of errors in the transmission of facsimile signals.

Facsimile and television are each concerned with the transmission of images by converting an original multi-dimensional subject into time-varying signals corresponding to the density variations along some predetermined scanning raster. Means are provided at the receiving location to reconvert the signals into corresponding density variations along a corresponding scanning raster.

One major problem inherent in prior art facsimile systems is the protracted or elongated streaking errors in the reconstituted copy which result from the dropping or loss of a pulse, or the picking up of or addition of extra pulses due to noise in the transmission channel. This problem is particularly acute in facsimile systems employing transition coding wherein the tri-level or bipolar signals correspond to the black-to-white or white-to-black transitions respectively. In such facsimile systems, streaking often occurs on the reconstituted copy due to the picking up or dropping of a facsimile signal due to noise in a communication channel. Streaking may be defined as the generation of a series of consecutive errors in the facsimile receiver for each individual transmission error. In a sense, the above mentioned coding techniques are particularly prone to streaking errors because of the memory type function which the successive pulses perform. Due to this memory type function, in which the successive information is presumed to be of a particular level, i.e., either black-or-white, until the next transition is received, the problem is compounded because, not only is the received signal incorrect but the next successive transition is likely to be of the wrong polarity thereby generating further errors.

Another serious problem in prior art facsimile systems has been the time required to establish synchronization between the transmitter and receiver especially when the system is initially turned on. While some facsimile systems rely wholly on the power line phasing to accomplish synchronization, it is often desirable, especially where the transmitter and receiver are on separate power systems, to insure synchronization. One method of establishing synchronization is to use initially transmitted signal transitions to properly phase the receiver clock with respect to the transmitter clock. Examination of a typical letter, for example, will show that the lines of typing actually occupy considerably less than half the vertical dimension of the document; the rest of this dimension being blank and corresponding to margins and spacing between the lines. Thus, if the facsimile system is to be synchronized by the initially transmitted transitions and the original document is a typical letter, a long initial non-transition period is likely to occur. Thus, the receiver will not attempt to establish sync with the transmitter during the scanning of the unmarked, informationless or margin areas of the original document. This method of synchronizing has been found to be generally unacceptable because the sync capture time is unduly delayed.

It is therefore an object of the invention to minimize the deleterious effect of noise in the communication link of a facsimile system.

It is another object of the invention to provide a method and apparatus for eliminating streaking in a digital facsimile system.

It is another object of the invention to decrease synchronization capture time in a facsimile system.

It is a further object of the invention to decrease the number of printed errors in a facsimile system.

It is yet another object of the invention to provide a method and apparatus for increasing the number of transitions in the transmitted signals of a synchronous digital facsimile system.

In accomplising the above and other desirable objects applicant has invented a new error correction method and novel facsimile coding apparatus which generates error correction transitions in the transmitted facsimile signals by logically mixing or combining the bi-level video pulse stream and a basic timing or clock pulse stream at the facsimile transmitter. Thus, at least a portion of the normally non-transition transmission times are chopped, divided or broken up at the basic transmitter clock rate. In accordance with the preferred embodiment of applicant's invention, white, unmarked or informationless transmission times greater than one clock bit time are varied or broken up at the basic transmitter clock rate. Due to the creation and detection of error correction transitions, the memory type streaking effect of errors due to noise or extraneous signals in the transmission path is reduced to one bit errors in the printed document at the receiver.

For a more complete understanding of applicant's invention, reference may be had to the following detailed description in conjunction with the drawings in which.

Figure 1:
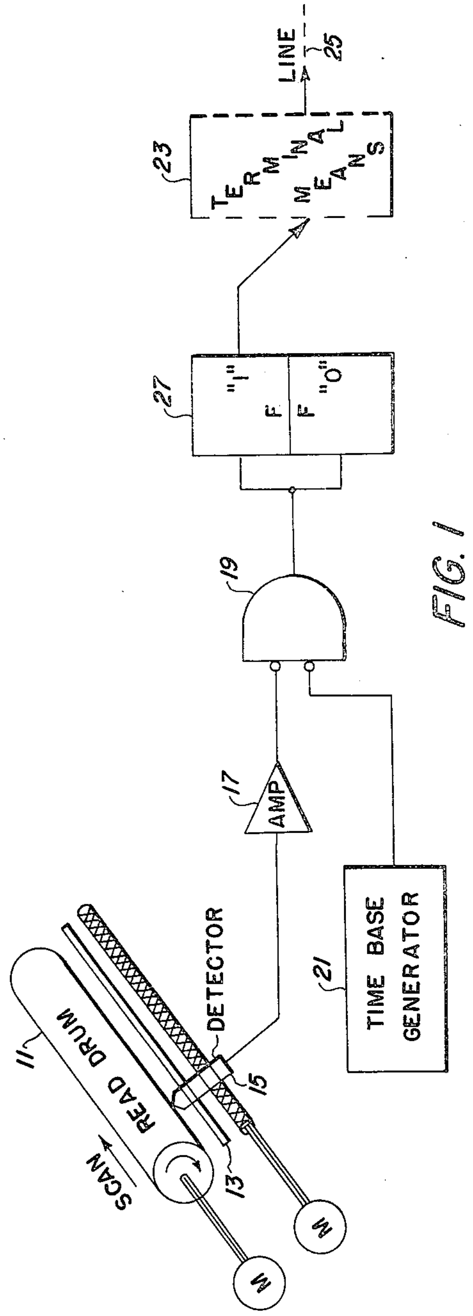
FIG. 1 is a block diagram of a facsimile transmitter embodying the principles of applicant's invention.

Referring now to FIG. 1 there is shown a block diagram of a facsimile transmitter wherein the white or unmarked background signals of the bi-level video pulse train are broken up or divided at the basic clock rate. The document to be scanned and sent via a facsimile system may be positioned on a rotatably supported reading drum 11 by any known means. The rotation of the drum brings successive areas of a document under the bright illumination of lamp 13 and the varying intensity reflected signals which correspond to the scanned information is focused on a light responsive scan detector 15. The output of light responsive detector 15 which may be, for example, a photoelectric cell is coupled to an amplifier 17 which may comprise, for example, a clocked, squaring amplifier. The output of amplifier 17 is coupled to one input of logical AND gate 19. The other input of logical AND gate 19 is coupled to the output of the transmitter time base generator 21. The time base generator 21 may be of any type well known in the art, for generating a pattern of control or clock pulse signals for timing the basic operation of the facsimile transmitter. For example, an input pulse generated in response to each revolution of the reading drum 11 may be used to selectively actuate the time base generator. An output of the timing genertor may be used to selectively control the relative translatory motion between the reading or scan head and the drum which as shown, may comprise a selectively rotatable lead screw having the scan detector 15 mounted thereon.

In a typical prior art facsimile system, the binary or bi-level video signals, which correspond to the density variations of the light reflected from the scanned document, are normaly applied to a transmitter terminal for transmission via the communication link coupling the transmitter to the receiver. Depending upon the length of the transmission path and the type communication link, the terminal may comprise a frequency shift-keyed modulator responsive to the binary signals emanating from the amplifier. Alternatively, if the communication link interconnecting the transmitter and receiver is relatively short, the signals themselves may be applied to, for example, a direct coaxial link. However, as is known in the art, coding schemes that send transitions are particularly suited for transmission of such signals as they minimize the direct current components in the transmitted power spectrum.

In accordance with the disclosed invention the video signals emanating from amplifier 17 are mixed in logical AND gate 19 to generate a number of error correction transitions during the otherwise transitionless or white transmission times. Gate 19 may be, for example, a NAND gate which develops a positive or high output in response to the simultaneous application of a low signal to each input. Additional information regarding the equivalence of other logical gating functions may be had by referring to section 5.7 of MIL–STD–806B, published Feb. 26, 1962. The output pulses from logic gate 19 are fed to the inputs of a coding flip-flop 27. Flip-flop 27 may be for example, a cross coupled transistorized complementing flip-flop which changes state in response to the application of each input pulse. The output of flip-flop 27 is coupled to transmitter terminal means 23 which, as hereinabove described, may comprise any means for coupling the tri-level signals to a communication link 25. As will be hereinafter more fully explained in conjunction with FIG. 3, the output of coding flip-flop 27 corresponds to the bi-level pulse train emanating from amplifier 17 with the white background or informationless signals are braken up or divided at the clock rate.

Figure 2:
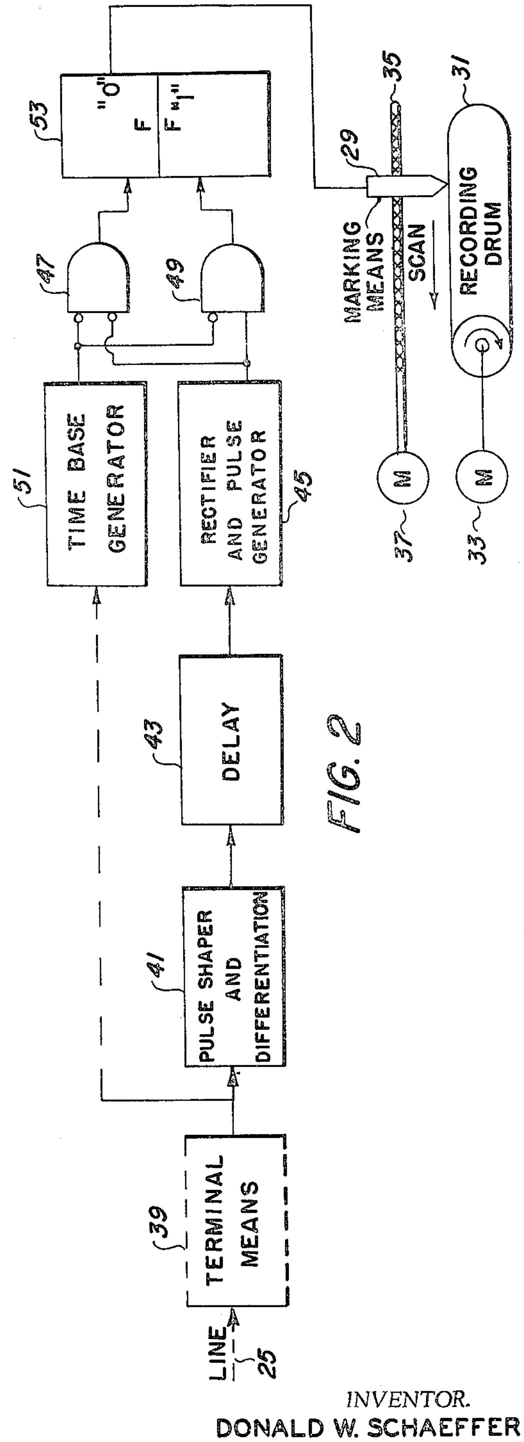
FIG. 2 is a block diagram of a facsimile receiver embodying the principles of applicant's invention.

Referring now to FIG. 2 there is shown a facsimile receiver in accordance with the present invention which is compatible with the facsimile transmitter shown in FIG. 1. As shown, the facsimile receiver comprises a marking head 29 which may be of any conventional type well known in the art, operating in conjunction with and writing on a record medium supported on, for example, a continuously rotating drum 31 which is driven, for example, by a motor 33. The relative translatory motion between the marking head 29 and recording drum 31 may be accomplished by any means known in the art, for example, marking head 29 may be mounted on a continuously or intermittently driven lead screw 35 whereby the rotation of lead screw by, for example, a motor 37 selectively positions the recording head during the printing operation. As is known in the art, recording drum 31 must rotate in synchronism with the read drum 11 and any suitable means known in the art may be used to accomplish this synchronism.

As is known in the art, the facsimile of the transmitted document is prepared by selectively actuating marking head 29 in resopnse to signals received from the transmitter. The received signals are coupled from the receiver terminal means 39 to a pulse shaping and differentiator network 41. The pulse shaping network may include any amplifier known in the art and a conventional differentiator circuit. The output of the differentiator is coupled to a delay and filter network 43 wherin the differentiated pulses are delayed and shaped. As hereinafter will more fully explain in conjunction with FIGS. 3 and 4, the ceived pulses are preferably delayed approximately one quarter cycle of the clock pulse repetition frequency to facilitate the periodic sampling of the reconstituted video pulse train. The output of the delay and filter network 43 is coupled to a full wave rectifier and pulse generator 45. The ouput of the full wave rectifier and pulse generator, which may comprise any standard full wave rectifier and a pulse generator, for example, a one-shot or Schmitt trigger responsive to the rectified pulses, is coupled to the inputs of a pair of logical gates 47 and 49. Logic gates 47 and 49 may be of any type well known in the art. As shown, gates 47 and 49 may comprise a NAND and NOR gate respectively, however, as would be known to those skilled in the art, functional equivalents of the logic gates could equally well be substituted for those shown. For example, the output of the delay circuit 43 could be utilized to drive a bistable flip-flop or the like with the respective outputs of the bistable flip-flop coupled as one input to the respective AND gates. In such a configuration, the AND gates would be identical in structure and operation and the state of the flip-flop would selectively enable one of the pair of AND gates and disable the other. An output from one of the AND gates would be generated at the receiver clock pulse time in accordance with the state of the flip-flop. Information on logical equivalents of gates 47 and 49 may be had by referring to the hereinabove mentioned MIL–STD–806B.

The other input to the pair of logical gates is coupled to the output of a receiver time base generator 51. The receiver time base generator 51 may comprise any pulse generator network which produces basic timing pulses for controlling the operation of the facsimile receiver. Preferably, the reciever time base generator is in synchronism with, i.e., in a fixed phase relationship to, the output of the transmitter time base generator. The synchronization may be accomplished, for example, by coupling appropriate received sync pulses from the receiver terminal means to the input of the receiver time base generator and phasing the localy generated pulses in response thereto.

The outputs of the pair of logical gates 47 and 49 are coupled to the respective input terminals of a decoding flip-flop 53. Decoding or reconstituting flip-flop 53 may comprise, for example, the hereinabove mentioned transistorized cross coupled flip-flop, wherein an input signal to the respective input terminals of the flip-flop triggers the flip-flop to the one or "black" and zero or "white" state, respectively. The output of the decoding flip-flop is used to selectively actuate the marking head 29 whereby the marking element selectively traces out the facsimile of the transmitted document in response to the signals emanating from the one or "black" state of the flip-flop.

Figure 3:
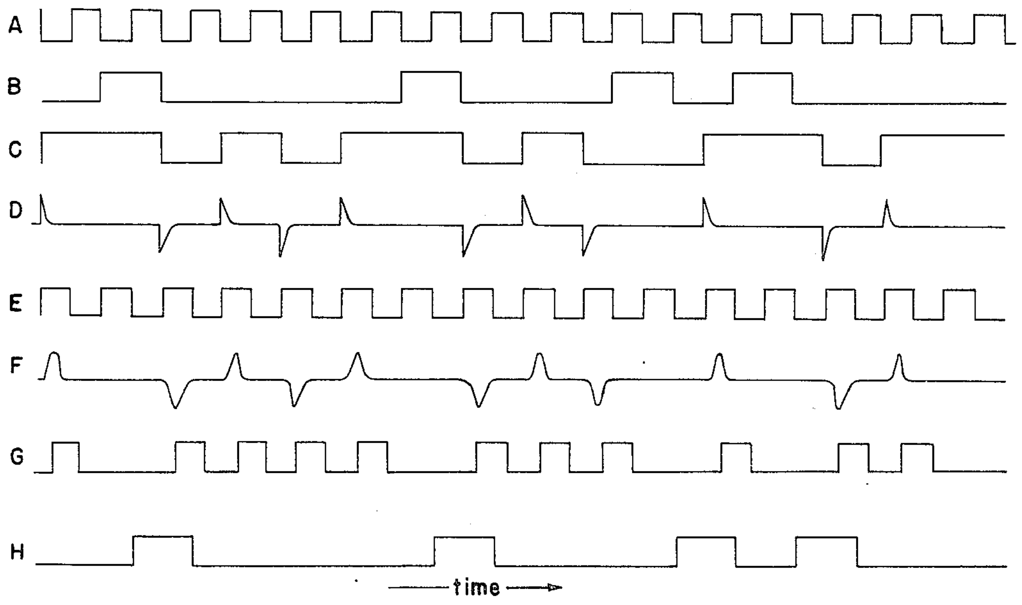
FIG. 3 is a series of idealized voltage-time waveforms which characterize the error reducing operation of the facsimile system as shown in FIGS. 1 and 2.

Referring now to FIG. 3 the error free operation of the facsimile system comprising the transmitter illustrated in FIG. 1 and the receiver illustrated in FIG. 2 will now be explained. Waveform A shows the scanner clock pulse train generated by transmitter time base generator 21. Waveform B shows a representative pulse train which emanates from clocked squaring amplifier 17 during a portion of the scanning time of a document to be transmitted. With respect to waveforms A and B the respective levels may correspond to any voltage levels, for example, the down may be minus 12 and the up zero volts with the black and white signals from the amplifier corresponding to the 0 and −12 levels, respectively. With the coding flip-flop 27 initially set to the zero or "white" state, the output of coding flip-flop 27 in response to the input of waveform A and B to gate 19 is shown in waveform C. As shown, the corresponding down or "white" portions of waveform B are broken up or divided at the clock rate, thus waveform C has a maximum number of transitions during the "white" transmission time. Waveform D illustrates a typical waveform appearing at the output of transmitter terminal means 23 in response to the information emanating from coding flip-flop 27. The particular transmission terminal means employed in a particular facsimile system is a function of the communication link coupling the transmitter and receiver and the distance spanned thereby. The illustrated waveforms correspond to the commonly employed transition coding scheme, however, as would be evident to those skilled in the art, the output of the coding flip-flop could equally well be employed to control a frequency shift-keyed modulator or any other modulation technique well known in the art. Waveform E illustrates a typical receiver or printer clock train. As illustrated, the receiver clock train would be locally generated by receiver time base generator 51 and would be synchronized with the transmitter clock, for example, by received sync pulses. As illustrated, the receiver or printer clock train is 180° out of phase with the transmitter clock pulse train.

The received facsimile signals are coupled from receiver terminal means 39 to suitable shaping circuitry. The function of the shaping circuitry will depend upon the particular modulation or coding scheme employed, for example, in a dicode or restored polar modulation scheme the shaping circuitry would detect the presence of the respective bipolar pulses corresponding to the binary "zero-to-one" and binary "one-to-zero" transitions respectively. After the received signals are amplified and shaped they are conventionally differentiated and applied to a delay circuit. The output of the delay network is coupled to a full wave rectifier for generating unipolar pulses from the bipolar information containing waveform shown in waveform F. The output of the delay network, after rectification, is used to generate a binary pulse train G corresponding to the information pulses of waveform F. The amount of time delay introduced into the path of the received signals would normally depend upon the type of sampling scheme employed. As shown with the receiver clock synchronized with and 180° out of phase with the transmitter clock stream, the received pulses are delayed in the order of 90° to 180° to facilitate sampling the reconstituted video pulse stream G with the negative going transition of the receiver clock.

As hereinabove stated, the coded facsimile pulses, in accordance with the principles of applicant's invention, comprise not only the video "black"-to-"white" or "white"-to-"black" transitions, but a plurality of error correcting transitions at the clock rate during the normally white, informationless or background transmission times. In order to recover or reconstitute a binary pulse train similar to waveform B, which corresponds to the video pulse train, waveform E, the receiver or printer clock train, and waveform G, which corresponds to the delayed and shaped information pulses are logically gated in gates 47 and 49 with the outputs thereof controlling decoding flip-flop 53. With decoding flip-flop 53 initially set in the zero or "white" state the waveforms appearing at the "1" or "black" output are shown in waveform H. A comparison of waveform B and waveform H on a time basis will show that waveform H is an exact replica of waveform B time displaced approximately one-half the period of the clock pulse repetition frequency.

In accordance with the invention the respective inputs to the logic gates 47 and 49 from pulse generator 45 and from time base generator 51 are designed such that the error correction transitions which correspond to periodic "black"-to-"white" and "white"-to-"black" transitions in the transmitted waveform are not reflected in the output waveform of the decoding flip-flop 53. As shown, if the output of pulse generator 45 is high during the negative transition of receiver clock waveform E, the decoding flip-flop 53 is driven to the white or zero state. However, if the level of the reconstituted waveform G or M is low when receiver clock pulse E goes low, the decoding flip-flop 53 is driven to the one or black state. Thus, the error correction transitions, which would drive the decoding flip-flop to the proper state if an error had occurred prior thereto, are in effect subtracted or eliminated from the received video pulse train by logically combining the reconstituted video pulse train with the locally generated clock pulse stream. Other logical circuit configurations, for example, adding the received coded video and locally generated clock pulse streams modulo-2 may be adapted by those skilled in the art to reconstitute the true video pulse stream by eliminating the periodic error correction transitions.

Figure 4:
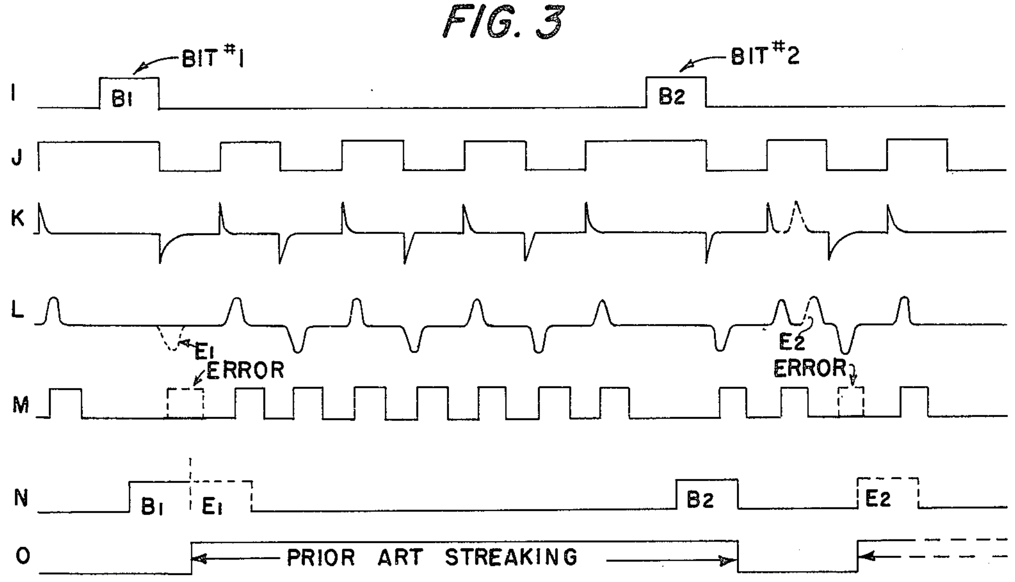
FIG. 4 is a series of idealized voltage-time waveforms which characterize the operation of the facsimile system as shown in FIGS. 1 and 2 in the presence of noise induced errors.

Referring now to FIG. 4, the operation of the facsimile system including the transmitter illustrated in FIG. 1 and the receiver illustrated in FIG. 2 will be explained in the presence of errors in the received signals. For simplicity neither the transmitter clock pulse stream, i.e., waveform A, nor the receiver clock pulse stream, i.e., waveform E have been redrawn in FIG. 4, however, FIGS. 3 and 4 are aligned such that the respective clock pulse times define the same time in both diagrams. Waveform I shows a representative pulse train which emanates from amplifier 17 during a portion of the scanning of the document to be transmitted. The respective "black" and "white" bits were chosen to facilitate the description of the circuitry after errors are induced during transmission by, for example, noise in the communication link. Waveform J is similar to waveform C of FIG. 3 in which the signal appearing at the output of logical gate 19 corresponds to the information or "black" signals emanating from amplifier 17 with the "white" areas broken up or divided at the transmitter clock pulse rate. Waveform K is similar to waveform D of FIG. 3 in which the transitions of the binary pulse train coded in accordance with the principles of applicant's invention are applied to the transmission link.

In waveform K, which is similar to waveform D of FIG. 3, two errors $E_1$ and $E_2$ have been assumed at two different times during a period of the transmission. The first error $E_1$ arbitrarily has been assumed to be a drop, i.e., a transmitted pulse applied to the lines is lost due to noise interference in the line, while the second error, $E_2$, has been assumed to be a hit, i.e., an extraneous signal which has been introduced into the transmitted pulse train due to the occurrence of noise. While only single bit errors have been shown, the operation of applicant's circuit in the presence of multiple bit errors would be unchanged except for the duration of the errors in the transmitted waveform. Waveform L corresponds to the shaped and delayed waveform K with the errors $E_1$ and $E_2$ shown in dotted lines. Waveform M corresponds to waveform G of FIG. 3 and comprises the output of a pulse generator in response to the rectified waveform L. In waveform M, $E_1$, the first error is shown as a missing pulse and error $E_2$ is shown as an added pulse. Waveform N is the decoded or reconstituted information pulse train, however, in the case of FIG. 4 two error pulses, $E_1$ and $E_2$ are shown. A comparison of waveform N and waveform I on a time basis shows that the two information bits were faithfully reproduced with waveform N being shifted one-half the period of the clock pulse repetition frequency.

The errors $E_1$ and $E_2$ which were picked up during the transmission of the facsimile information signals from the transmitter to the receiver appeared in the decoded waveform as single bit errors. This reduction in the error duration time to a single bit eliminates the streaking which would normally occur if conventional facsimile coding techniques were employed. As shown in waveform O an error such as $E_1$ would normally generate a succession of errors, which would continue for a time determined by the occurrence of the next noise or legitimate information bit in which the transition, i.e., "black"-to-"white" or "white"-to-"black", is opposite the noise effect. As shown, error $E_1$ in the received pulse train would have generated continuous errors or streaking until the down going or "black"-to-"white" tansition of bit $B_2$. This continuous error would have appeared as a streak across what should have been an informationless or "white" area. By employing applicant's coding and decoding technique, a single error in the received signals is limited to a one bit error. In a normal system a single bit error would not be objectionable as it would comprise a simple dot or mark approximately one-one-hundredth of an inch across. The actual dimension of the mark would depend upon the resolution of the facsimile system.

The foregoing description teaches a method and apparatus for eliminating the streaking effect of a transmission error in digital facsimile systems by creating a number of error correcting transitions during otherwise transitionless transmission times. While in the foregoing desciption the "white" transmission times were broken up or divided at an error correction pulse rate, it is to be understood that either the entire or selected portions of the "black" transitionless transmission times could be similarly broken up if the original document involved a white on black record.

As would be evident to those skilled in the art, the principles of applicant's invention may equally well be applied to other types of data communication systems. Further, while in the preferred embodiment of the invention the basic clock pulse train is utilized to create error correcting transitions in the otherwise informationless or zero transition background transmission times, other pulse streams or trains could be employed. For example, a separate error checking or parity pulse train could be derived, for example, from an independent source or as a multiple or sub-multiple of the basic clock, and utilized to increase or maximize the transitions in the otherwise transitionless transmission times.

The invention has been described in terms of a specific embodiment for eliminting the protracted streaking effect of errors in the transmission of facsimile signals. The particular set of signals described hereinabove are obviously not unique nor are the particular suggested embodiments of the logical gating, amplifiers or pulse shaping circuits intended to be in any way limiting. Many modifications will suggest themselves to those skilled in the art for practicing the principles of applicant's invention without departing from the spirit of the disclosed invention. Therefore, the foregoing description and drawings are to be understood to be illustrative only and the invention is to be interpreted broadly in terms of basic concepts. It is accordingly applicant's intention to be limited only as indicated by the scope of the appended claims.

What is claimed is:

1. In a facsimile system including a transmitter having a scan detector for scanning along a predetermined raster a document to be transmitted and a clocked amplifier responsive to the detector for developing a bi-level video signal train wherein a first level is indicative of a blank, unmarked or background area in the document to be transmitted and additionally including a receiver having a selectively positionable marking element responsive to received video signals for selectively marking a record thereby generating a facsimile of the original document, the improvement comprising:

error correcting means for eliminating the streaking effect of transmission errors, said correcting means including:

first logical means at the transmitter for coding said video pulse train by generating a number of error correcting transitions in the video pulse train during at least selected portions of otherwise transitionless transmission times, said number being a function of the duration of said selected portions, and second logical means at the receiver for decoding said received coded signals and reconstituting the original video pulse train by deleting the error correction transitions in the absence of errors and limiting the duration of the streaking effect in the presence of received error signals, said second logical means consisting of:

first and second logical gating means responsive to shaped and delayed received video pulses and to a localy generated pulse train, said locally generated pulse train being synchronized with said train of coding pulses, and a bistable flip-flop responsive to pulses emanating from said first and second logical gating means.

2. The improvement defined in claim 1 wherein said locally generated pulse train is 180° out of phase with said train of coding pulses and wherein said received video pulses are delayed a period of time substantially equal to one half the reciprocal of the pulse repetition frequency of said coding pulse train.

3. A facsimile system comprising means for generating a transmitter clock pulse train for controlling the operation of a facsimile transmitter, means for scanning along a predetermined raster a document to be transmitted, means responsive to said scanning means for generating a clocked bi-level video pulse train wherein a first level is indicative of marked or information areas of the document to be transmitted and a second level is indicative of a blank, background or informationless area of the document to be transmitted, AND gate means for logically combining said clocked video pulse train and said transmitter clock pulse train whereby at least portions of said informationless level of said video pulse train is chopped at the basic transmitter clock pulse frequency into a number of error correction transitions, terminal means responsive to signals emanating from said AND gate means for generating bi-polar signals to be transmitted over a communication link, said signals corresponding to transitions from the information to informationless and informationless to information levels of said video pulse train and to said error correction transitions respectively, means for generating a receiver clock pulse train for controlling the operation of a facsimile receiver, means for synchronizing said receiver clock pulse train with said transmitter clock pulse train, pulse generator means for shaping and delaying said bi-polar signals and for generating a bi-level pulse train in response thereto, a bistable device, logical means responsive to said receiver clock pulse train and to pulses emanating from said pulse generator means for controlling said bistable device whereby the error correction transitions are deleted from a reconstituted video pulse train in the absence of received error signals and wherein the duration of any error in the reconstituted video pulse train is limited to $n$-bit times where $n$ is an integer equal to the number of successive clock pulse times corresponding to the duration of any error signal, and marking means responsive to predetermined signals emanating from said bistable device for generating a facsimile of said document.

4. The system defined in claim 3 wherein said AND gate means comprises a single AND gate and wherein said logical means comprises a pair of AND gates responsive to opposite levels of said bi-level pulse train emanating from said pulse generator means.

5. In a facsimile system comprising a transmitter for transmitting a bi-level video signal train wherein a first level is indicative of information to be transmitted and wherein a second level is indicative of absence of information and a receiver responsive to received video signals for reproducing the information, error correcting means including, first logical means at the transmitter for coding the video signal train by generating a number of error correcting transitions in the signal train during at least selected portions of otherwise transitionless transmission times, the number being a function of the duration of the selected portions, and second logical means at the receiver for decoding the received coded signals and reconstituting the original video signal train by deleting the error correction transitions in the absence of errors and limiting the duration of the streaking effect in the presence of received error signals, wherein said second logical means consists of first and second logical gating means responsive to shaped and delayed video signals and to a locally generated pulse train, the locally generated pulse train being synchronized with a train of coded pulses and wherein the second logical means further consists of a bistable flip-flop responsive to pulses emanating from the first and second logical gating means.

6. The apparatus as set forth in claim 5 wherein the train of coding pulses comprises a basic timing clock pulse stream of said facsimile transmitter.

7. The apparatus as set forth in claim 5 wherein the locally generated pulse train is 180° out of phase with the train of coding pulses and wherein the received video pulses are delayed a period of time substantially equal to one-half of the reciprocal of the pulse repetition frequency of the coding pulse train.

8. The apparatus as set forth in claim 5, wherein the first and second logical gating means comprises first and second AND gates responsive to opposite levels of the delayed, received, video pulses.

References Cited

UNITED STATES PATENTS

| | | | |
|---|---|---|---|
| 3,179,889 | 4/1965 | King | 325—41 |
| 3,244,808 | 4/1966 | Roberts | 325—42 |
| 3,337,864 | 8/1967 | Lender | 325—42 |

ROBERT L. GRIFFIN, Primary Examiner

JOSEPH A. ORSINO, Jr., Assistant Examiner

U.S. Cl. X.R.

325—41, 42, 65